(12) United States Patent
Shimojima et al.

(10) Patent No.: US 6,362,447 B2
(45) Date of Patent: *Mar. 26, 2002

(54) ELECTRODE WIRE FOR ELECTRICAL DISCHARGE MACHINING APPARATUS

(75) Inventors: Kiyoshi Shimojima; Seigi Aoyama; Hideo Kawano; Koichi Tamura; Takahiro Sato; Takamitsu Kimura; Masato Watabe, all of Ibaraki (JP)

(73) Assignee: Hitachi Cable Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,863

(22) Filed: Mar. 9, 1999

(30) Foreign Application Priority Data

Mar. 13, 1998 (JP) .......................................... 10-080547
Apr. 23, 1998 (JP) .......................................... 10-131397

(51) Int. Cl.⁷ .................................................. B23H 1/00
(52) U.S. Cl. ................................ 219/69.12; 219/69.11; 219/69.15
(58) Field of Search .......................... 219/69.12, 69.11, 219/69.15; 428/658, 674

(56) References Cited

U.S. PATENT DOCUMENTS

| | | | | |
|---|---|---|---|---|
| 4,631,237 A | * | 12/1986 | Dommer et al. | 428/621 |
| 4,686,153 A | * | 8/1987 | Tominaga et al. | 428/610 |
| 4,935,594 A | * | 6/1990 | Groos et al. | 219/69.12 |
| 5,808,262 A | * | 9/1998 | Mukherjee | 219/69.12 |

FOREIGN PATENT DOCUMENTS

| | | |
|---|---|---|
| JP | 6-47130 | 4/1990 |
| JP | 5-339664 | 12/1993 |

OTHER PUBLICATIONS

Wire Electrode for WEDM "Fullace", Furukawa Electric Review No. 75, Mar. 1985, pp. 47–53.

* cited by examiner

Primary Examiner—M. Alexandra Elve
(74) Attorney, Agent, or Firm—McDermott, Will & Emery

(57) ABSTRACT

It is an object of the invention to provide an electrode wire for an electrical discharge machining apparatus, which is low-priced in cost of production, has sufficient conductivity and strength at high temperature and is suited for improving the speed of electrical discharge machining. Cu—Zn alloy covering layer is formed around a core metallic wire formed of Cu—0.02 to 0.2 Zr alloy or Cu—0.15 to 0.25 Sn—0.15 to 0.25 In alloy.

2 Claims, 2 Drawing Sheets

ELECTRODE WIRE FOR ELECTRICAL DISCHARGE MACHINING APPARATUS

FIELD OF THE INVENTION

This invention relates to an electrode wire for an electrical discharge machining apparatus, and especially to an electrode wire for an electrical discharge machining apparatus having a covering layer.

BACKGROUND OF THE INVENTION

As a conventional electrode wire for an electrical discharge machining apparatus, a Cu—Zn alloy wire (a brass wire) containing Zn of 32 to 36 weight percent is used.

Besides this, a composite wire composed of a core metallic wire formed of a steel wire and a covering layer formed of Cu—35Zn alloy is known as an electrode wire for an electrical discharge machining apparatus with height strength. Moreover, an electrode wire for the same, which is composed of a core metallic wire formed of Cu alloy, such as Cu—0.15Sn or Cu—0.15Ag alloy, and a covering layer formed of Cu—35Zn alloy is known (Japanese Patent Publication No. 6-47130).

As a method for increasing electrical discharge machining speed and obtaining an electrode wire for the same with high efficiency, a method, in which concentration of Zn of Cu—Zn alloy is increased or heat-resisting property of the electrode wire is improved by adding Al to Cu—Zn alloy, is known (Furukawa Electric Review, No.75, March, 1985).

Recently, further elevation of electrical discharge machining speed is demanded from a view point of improvement of productivity. In order to meet the aforementioned demand, an electrode wire with covering layer for an electrical discharge machining apparatus, which is composed of a core metallic wire formed of Cu—2.0Sn, Cu—0.3Sn, Cu—13Zn, Cu—0.6Ag or Cu—4.0Zn—0.3Sn and a covering layer formed of a Cu—Zn alloy containing Zn of high weight percent, is proposed (Japanese Patent Kokai No.5-339664).

However, in the aforementioned electrode wire for the electrical discharge machining apparatus, since the Cu—Zn alloy layer contains Zn of 38 to 49 weight percent, the Cu—Zn alloy layer is formed of a mixing composition of α and β phases, or a single phase composition of only β phase. Since cold working of the Cu—Zn alloy layer becomes difficult as a composition of β phase becomes dominant, the aforementioned electrode wire for the electrical discharge machining apparatus can be produced only by hot working (hot extrusion), hence production cost thereof becomes high.

Moreover, in the aforementioned electrode wire for the electrical discharge machining apparatus, since Cu alloy, such as Cu—2.0Sn, Cu—0.3Sn, Cu—13Zn, Cu—0.6Ag or Cu—4.0Zn—0.3Sn, is adopted as material of the core metallic wire, following disadvantages are inevitable. This product is detective in workability in the process of drawing in case that the core metallic wire is formed of Cu—2.0Sn. Heat-resisting property (strength at high temperature) of the product is low, and at the time of practical use, instability of discharge occurs because of the breaking of a wire or the elongation of the wire before the breaking in case that the core metallic wire is formed of Cu—13Zn. In the product with low electrical conductivity (in case that the core metallic wire is formed of Cu—4.0Zn—0.35Sn) or low heat-resisting property, improvement of electrical discharge machining speed is not satisfactory. In case of alloy containing Ag, material cost becomes high. Referring to the core metallic wire, since heat-resisting property of a Cu alloy disclosed in Japanese Patent Kokai No. 6-47130 is insufficient, electrical discharge machining speed cannot be improved (Cu—0.15Sn), and material cost of Cu alloy containing Ag is high in general.

SUMMARY OF THE INVENTION

Accordingly, it is an object of the invention to solve the aforementioned problems and provide an electrode wire for an electrical discharge machining apparatus composed of a core metallic wire formed of Cu alloy and a covering layer formed of Cu—Zn alloy, which is low priced in material cost, has sufficiently high electrical conductivity and heat-resisting property and is suited for improving electrical discharge machining speed.

It is a further object of the invention to provide an electrode wire for an electrical discharge machining apparatus, which is composed of a core metallic wire formed of Cu alloy and a Cu—Zn alloy covering layer formed of a single phase composition of only α phase.

It is a still further object of the invention to provide an electrode wire for an electrical discharge machining apparatus, which is composed of a core metallic wire formed of Cu alloy and a Cu—Zn alloy covering layer formed of a mixing phase composition of α and β phases.

According to the first feature of the invention, an electrode wire for an electrical discharge machining apparatus comprises:

a core metallic wire formed of Cu—0.02 to 0.2Zr alloy or Cu—0.15 to 0.25Sn—0.15 to 0.25In in alloy, and a covering layer formed of Cu—Zn alloy.

According to the second feature of the invention, an electrode wire for an electrical discharge machining apparatus comprises:

a core metallic wire formed of Cu—0.02 to 0.2 Zr alloy or Cu—0.15 to 0.25Sn—0.15 to 0.25 In alloy, and a Cu—Zn alloy covering layer formed of a single phase composition of only α phase.

According to the third feature of the invention, an electrode wire for an electrical discharge machining apparatus comprises:

a core metallic wire formed of Cu—0.02 to 0.2Zr alloy or Cu—0.15 to 0.25Sn—0.15 to 0.25 In alloy, and a Cu—Zn alloy covering layer formed of a mixing composition of α0 and β phases.

The invention pays the attention to material of a core metallic wire of an electrode wire for an electrical discharge machining apparatus having a covering layer formed of Cu—Zn alloy.

The reason for limiting material of the core metallic wire to Cu-alloy is that tensile strength and electrical conductivity at high temperature is satisfactory. A steel wire is omitted, because it is defective in straightness, when it comes loose. Moreover, it is difficult to apply the steel wire to a processing machine. A Cu wire is omitted because tensile strength thereof at high temperature is insufficient.

The reason for selecting the aforementioned numerical values on composition of the core metallic wire will be explained.

In Cu—0.02 to 0.2Zr alloy, when concentration of Zr is less than 0.02 weight percent, heat-resisting property of alloy is insufficient and instability of discharge arises, and when concentration of Zr is more than 0.2 weight percent, it exceeds the limit of solid solution of Cu—Zn alloy and precipitation of $Cu_3Zr$ starts, and the breaking of a wire is apt to occur, so that concentration of Zr is limited within a range of 0.02 to 0.2 weight percent. Since Cu—0.05 to 0.16Zr alloy, in which concentration of Zr is 0.05 to 0.16 weight percent, is widely used for various purposes as Cu—0.16Zr alloy, this alloy is the most economical in Cu—Zr alloy.

Next, concentrations of Sn and In in Cu—0.15 to 0.25Sn—0.15 to 0.25 In alloy will be discussed. Sn and In are added to alloy in order to increase the strength of alloy, but the effect of Sn on a decrease of the electrical conductivity of alloy is more noticeable than that of In. Since the electrical conductivity of the wire should be kept to be high from a view point of stability of discharge characteristic, it is desirable that concentration of In is higher that of Sn. However, since In is high-priced, concentration of In is kept to be less than 0.25%. Accordingly, there is necessity to increase the amount of addition of Sn, but the conductivity of alloy noticeably decreases in case that concentration of Sn is more than 0.25 weight percent. The aforementioned composition is selected on the basis of trade-off between improvement of discharge characteristic and economical consideration.

Moreover, concentration of Zn of Cu—Zn alloy will be discussed. In case that concentration of Zn is 32 to 38 weight percent, Cu—Zn alloy can be formed of a single phase composition of a phase, and in the region of $\alpha$ phase, although tensile strength and hardness increases as concentration of Zn increases, hardness is not so high and Cu—Zn alloy can be processed by cold working. Accordingly, manufacturing process including drawing is easily carried out. Concentration of Zn of 32 to 36 weight percent corresponds to that of Cu—35Zn alloy (65/35 brass), which is widely used for various purposes. Cu—35Zn alloy is formed of a single phase composition of $\alpha$ phase, suited for cold working, easily obtained on the market and favorable from a viewpoint of economy.

Furthermore, since the thickness of the covering layer formed of Cu—Zn alloy is consumed by about 30 $\mu$m in an electrical discharge machining process of high efficiency, the thickness of the covering layer formed of Cu—Zn alloy is selected to be more than 30 $\mu$m in order to avoid a situation that the breaking of a wire occurs, and less than 40 $\mu$m, because the electrical conductivity of the wire becomes insufficient for fulfilling the function of an electrode wire for an electrical discharge machining apparatus in case that the thickness of the covering layer is more than 40 $\mu$m.

BRIEF DESCRIPTION OF THE DRAWINGS

The invention will be explained in more detail in conjunction with appended drawings, wherein.

DESCRIPTION OF THE PREFERRED EMBODIMENTS

Thereafter, the preferred embodiments of the invention will be explained.

Figure 1:
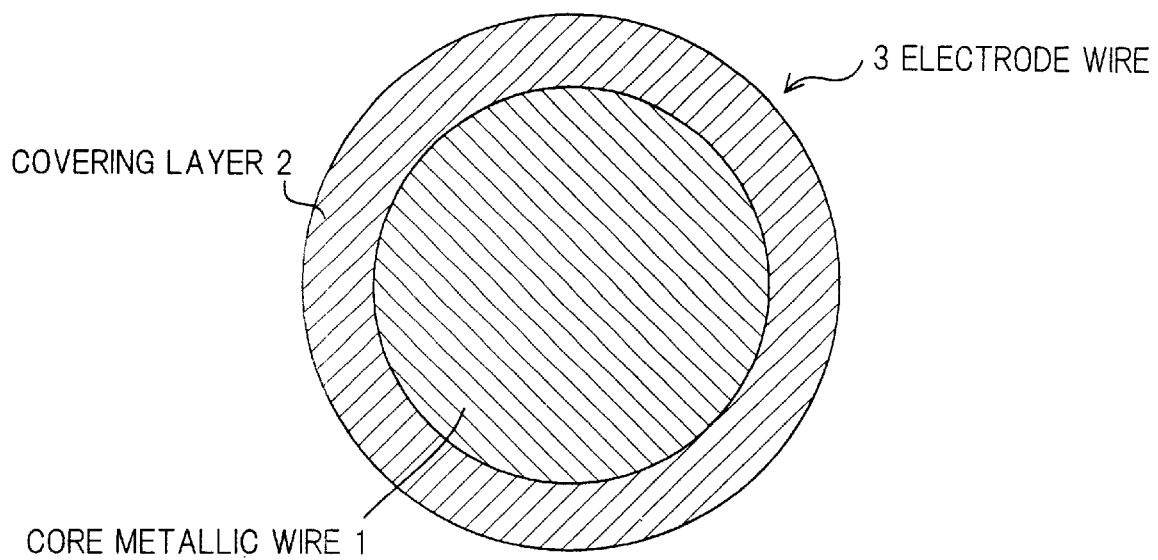
FIG. 1 is a cross-sectional view of an electrode wire for an electrical discharge machining apparatus having a covering layer.

FIG.1 shows a cross-sectional view of an electrode wire for an electrical discharge machining apparatus according to the invention.

As shown in FIG. 1, the electrode wire 3 for the electrical discharge machining apparatus according to the invention is composed of a core metallic wire 1 formed of Cu—0.02 to 0.2 Zr alloy (or Cu—0.15 to 0.25 Sn—0.15 to 0.25 In alloy) and a covering layer 2 formed of Cu—Zn alloy, which is formed of a single phase composition of a phase or a mixing composition of $\alpha$ and $\beta$ phases.

According to an electrode wire for an electrical discharge machining apparatus, which is composed a core metallic wire formed of Cu—0.02 to 0.2 Zr alloy or Cu—0.15 to 0.25 Sn—0.15 to 0.25 In alloy and a covering layer formed of Cu—Zn alloy being formed of a single phase composition of $\alpha$ phase, according to the invention, the electrode wire for the electrical discharge machining apparatus with high efficiency, which can be easily processed by cold working, can be obtained. That is to say, since the Cu—Zn alloy covering layer according to the invention is formed of a single phase composition of a phase, the mechanical property of the Cu—Zn alloy covering layer according to the invention is different from that of a conventional Cu—Zn alloy covering layer, which When Cu—35Zn alloy, which is easily obtainable on the market, the lowest in price and widely used for various purposes, is selected among Cu—Zn alloy products, cost of production of the electrode wire for the electrical discharge machining apparatus can be further reduced.

On the other hand, in case that a Cu—Zn alloy covering layer is composed of a mixing composition of $\alpha$ and $\beta$ phases, although the improvement of electrical discharge machining speed is high, for concentration of Zn is high, it becomes difficult to process the Cu—Zn alloy covering layer by cold working, as percentage of $\beta$ phase composition increases. In such a case, if concentration of Zn near the surface of the Cu—Zn alloy covering layer is made to be low by heat treatment, the Cu—Zn alloy covering layer can be easily processed by cold working, though the content of Zn is high as a whole. Since it is extremely difficult to process a Cu—Zn alloy covering layer formed of a single phase composition of only $\beta$ phase by cold working, this alloy layer is in the outside of the scope in the invention.

(The First Preferred Embodiment)

A composite wire is formed by inserting a core metallic wire, which is formed of Cu—0.16 Zr alloy and has an external diameter of 7.1 mm, into a pipe, which is formed of Cu—35 Zn alloy and has an external diameter of 10 mm and a pipe thickness of 1.2 mm. The Cu—35 Zn alloy pipe is manufactured by ordinary extrusion process. is formed of a mixing composition of $\alpha$ and $\beta$ phases or a single phase composition of only $\beta$ phase. Tensile strength of the former is smaller than that of the latter, and reduction of area of the former is larger than that of the latter, so that deformability of the former is higher than that of the latter. In case that Cu—Zn alloy covering layer is formed of a single phase composition of $\alpha$ phase, the improvement of electrical discharge machining speed is small as compared with case that Cu—Zn alloy layer is formed of a mixing composition of $\alpha$ and $\beta$ phases or only $\beta$ phase, because concentration of Zn is reduced. However, in case of the electrode wire according to the invention, depreciation of the improvement of electrical discharge machining speed is made to be as small as possible by adopting the electrode wire having a core metallic wire formed Cu—0.02 to 0.2 Zr or Cu—0.15 to 0.25 Sn 0.15 to 0.25 In alloy. Although the Cu—Zn alloy covering layer is formed of a single phase composition of α phase, electrical discharge machining speed of the electrode wire for the electrical discharge machining apparatus according to the invention is far higher than that of the conventional electrode wire for the electrical discharge machining apparatus formed of solid Cu—35Zn alloy.

Since the electrode wire can be manufactured by cold working, the electrode wire thus obtained is low-priced and cost of production of the electrode wire for the electrical discharge machining apparatus can be reduced in turn.

The composite wire is formed into that with a diameter of 0.9 mm by drawing, to which heat treatment is applied for annealing.

Finally, the composite wire with a diameter 0.9 mm is drawn to be formed into that with a diameter of 0.25 mm, and an electrode wire for an electrical discharge machining apparatus, which comprises a Cu—Zn alloy covering layer with a thickness of 31 μm containing Zn of 35 weight percent, can be obtained.

Moreover, a composite wire is formed by inserting a core metallic wire, which is formed of Cu—0.16 Zr and has an external diameter of 7.1 mm, into a pipe, which is formed of Cu—40 Zn alloy and has an external diameter of 10 mm and a pipe thickness of 1.2 mm. The Cu—40 Zn alloy pipe is manufactured by ordinary extrusion process.

The composite wire is formed into that with a diameter of 7.9 mm by drawing, to which heat treatment is applied for annealing. Next, the composite wire is formed into that with a diameter of 1.2 mm by drawing, to which heat treatment is again applied for annealing.

Finally, the composite wire with a diameter of 1.2 mm is drawn to be formed into that with a diameter of 0.25 mm, and an electrode wire for an electrical discharge machining apparatus, which comprises a Cu—Zn alloy covering layer with a thickness of 31 μm containing Zn of 40 weight percent.

(The Second Preferred Embodiment)

The manufacturing process of an electrode wire for an electrical discharge machining apparatus according to the second preferred embodiment is the same as that of the first preferred embodiment except that a core metallic wire is formed of Cu—0.19Sn—0.2In alloy and an external diameter thereof is 7.1 mm, and electrode wires for the electrical discharge machining apparatus of two kinds, the Cu—Zn alloy layers of which respectively contain Zn of 35 and 40 weight percent and are commonly 31 μm thick, are manufactured.

Examples for Comparison 1

Two kinds of electrode wires for an electrical discharge machining apparatus, an manufacturing process of which is the same as that of the first preferred embodiment except that a core metallic wire is formed of Cu—0.2Sn alloy and an external diameter thereof is 7.1 mm, are manufactured as examples for comparison. The Cu—Zn alloy layers of the aforementioned electrode wires of two kinds respectively contain Zn of 35 and 40 weight percent and are commonly 31 μm thick. It is found that the core metallic wire formed of Cu—2.0Sn alloy is not suited for drawing process, and the manufacturing process of the electrode wire for the discharge machining apparatus comprising this alloy layer is not smooth.

Example for Comparison 2

Two kinds of electrode wires for an electrical discharge machining apparatus, a manufacturing process of which is the same as that of the first preferred embodiment except that a core metallic wire is formed Cu—0.3Sn alloy and an external diameter thereof is 7.1 mm, are manufactured as examples for comparison. The Cu—Zn alloy layers of the aforementioned electrode wires of two kinds respectively contain Zn of 35 and 40 weight percent and are commonly 31 μm thick.

Examples for Comparison 3

Two kinds of electrode wires for an electrical discharge machining apparatus, a manufacturing process of which is the same as that of the first preferred embodiment except that a core metallic wire is formed of Cu—0.15Sn alloy and an external diameter thereof is 7.1 mm, are manufactured as examples for comparison. The Cu—Zn alloy layers of the aforementioned electrode wires of two kinds respectively contain Zn of 35 and 40 weight percent and are commonly 31 μm thick.

Examples for Comparison 4

Two kinds of electrode wires for an electrical discharge machining apparatus, a manufacturing process of which is the same as that of the first preferred embodiment except that a core metallic wire is formed of Cu—0.13Sn alloy and an external diameter thereof is 7.1 mm, are manufactured as examples for comparison. The Cu—Zn alloy layers of the aforementioned electrode wires of two kinds respectively contain Zn of 35 and 40 weight percent and are commonly 31 μm thick.

Examples for Comparison 5

Two kinds of electrode wires for an electrical discharge machining apparatus, a manufacturing process of which is the same as that of the first preferred embodiment except that a core metallic wire is formed of Cu—4.0Zn—0.3Sn alloy and an external diameter thereof is 7.1 mm, are manufactured as examples for comparison. The Cu—Zn alloy layers of the aforementioned electrode wires of two kinds respectively contain Zn of 35 and 40 weight percent and are commonly 31 μm thick.

Examples for Comparison 6

Two kinds of electrode wires for an electrical discharge machining apparatus, a manufacturing process of which is the same as that of the first preferred embodiment except that a core metallic wire is formed of Cu—0.6Ag alloy and an external diameter thereof is 7.1 mm, are manufactured as examples for comparison. The Cu—Zn alloy layers of the aforementioned electrode wires of two kinds respectively contain Zn of 35 and 40 weight percent and are commonly 31 μm thick.

Examples for Comparison 7

Two kinds of electrode wires for an electrical discharge machining apparatus, a manufacturing process of which is the same as that of the first preferred embodiment except that a core metallic wire is formed of Cu—0.15Ag alloy and an external diameter thereof is 7.1 mm, are manufactured as examples for comparison. The Cu—Zn alloy layers of the aforementioned electrode wires of two kinds respectively contain Zn of 35 and 40 weight percent and are commonly 31 μm thick.

A CONVENTIONAL EXAMPLE 1

An electrode wire for an electrical discharge machining apparatus with an external diameter of 0.25 mm formed of only Cu—35Zn alloy is manufactured.

A CONVENTIONAL EXAMPLE 2

An electrode wire for an electrical discharge machining apparatus with an external diameter of 0.25 mm formed of only Cu—40Zn alloy is manufactured.

Table 1 shows the data of the core metallic wires used in the first to second preferred embodiments, the examples for comparison 1 to 7 and the examples of the conventional electrode wires 1 to 2. The units of chemical compositions shown in table 1 are given by weight percent.

TABLE 1

| | PROPERTY OF CORE METALLIC WIRE | | | ELECTRICAL DISCHARGE MACHINING SPEED | |
|---|---|---|---|---|---|
| COMPOSITION (wt %) | STRENGTH AT HIGH TEMPERATURE (MPa) | CONDUCTIVITY (% IACS) | WORKABILITY IN DRAWING | α PHASE COVER (Cu-35 Zn) | α + β PHASE COVER (Cu-40 Zn) |
| EMBODIMENTS | | | | | |
| 1  Cu-0.16 Zr | 255 | 80~90 | ○ | 1.16 | 1.21 |
| 2  Cu-0.19 Sn-0.21 n | 181 | 76 | ⊚ | 1.15 | 1.20 |
| EXAMPLES FOR COMPARISON | | | | | |
| 1  Cu-2.0 Sn | 196 | 30~40 | Δ | 1.11 | 1.16 |
| 2  Cu-0.3 Sn | 176 | 73 | ○ | 1.12 | 1.17 |
| 3  Cu-0.15 Sn | 166 | 83 | ⊚ | 1.13 | 1.18 |
| 4  Cu-13 Zn | 96 | 25~30 | ○ | 1.11 | 1.16 |
| 5  Cu-4.0 Zn-0.3 Sn | 176 | 50 | ○ | 1.10 | 1.15 |
| 6  Cu-0.6 Ag | 245 | 88 | Δ | 1.15 | 1.20 |
| 7  Cu-0.15 Ag | 245 | 94 | ○ | 1.15 | 1.20 |
| CONVENTIONAL ELECTRODE WIRES | | | | | |
| 1  Cu-35 Zn | — | — | ○ | 1.00 | |
| 2  Cu-40 Zn | — | — | Δ | 1.03 | |

Next, strengths at high temperature (MPa) conductivities (% IACS) and workabilities in drawing of the core metallic wires used in the first to second preferred embodiments, the examples for comparison 1 to 7 and the examples of the conventional electrode wires 1 to 2 are estimated. The results of the comparison are shown in table 1.

Strengths of the wires at high temperature are estimated as follow. Each core metallic wire with a diameter of 7.1 mm is deformed into that with a diameter of a 0.2 mm by drawings, and thereafter the temperature of the core metallic wire is kept to be 300° C. for ten minutes. The temperature of 300° C. corresponds to that of the core metallic wire of the electrode wire for the electrical discharge machining apparatus, when it is actually used for its essential purpose. Thereafter, a tensile strength of the core metallic wire is estimated. Electrical conductivity of the core metallic wire is measured after drawing process. The workability in the drawing process is estimated by actually drawing the core metallic wire by dices. The drawings are repeated by inserting heat treatments therebetween at need, and the workability is estimated on the basis of occurrences of the breaking of the wire, the degree of reduction of the cross-sectional area of the wire per one pass and the limit of reduction rate. A double circle, a single circle and a triangle respectively mean that the workability is excellent, acceptable and poor.

Next, electrical discharge machining speeds of the electrode wires for the electrical discharge machining apparatus according to the first to second preferred embodiments, the examples for comparison 1 to 7 and the examples of the conventional electrode wires 1 to 2 are estimated. The results of the estimation are shown in table 1.

Electrical discharge machining speed is measured on a work (a sample to be machined, JIS SKD-11) with a dimension of 60 mm by using an electrical discharge machining tester (FX10, manufactured by Mitsubishi Electric Co.). Electrical discharge machining speed is normalized on the basis of that of the conventional electrode wire 1 (2.184 mm/min.).

As shown in table 1, electrical discharge machining speeds of the electrode wires for the electrical discharge machining apparatus according to the first to second referred embodiments and the examples for comparison 1 to 7 are noticeably improved as compared with those of the conventional electrode wires 1 to 2. It can be presumed that the aforementioned results are attributable to the fact that the electrode wire for the electrical discharge machining apparatus with the covering layer is adopted. That is to say, it is useful for the advance of technology to adopt the electrode wire for the electrical discharge machining apparatus having a covering layer in stead of that formed of solid alloy, and thereby the speed of electrical discharge machining is increased.

On the electrode wires for the electrical discharge machining apparatus according to the first to second preferred embodiments and the examples for comparison 1 to 7, which respectively have the different qualities of the material, the properties of the core metallic wires and the improvements of electrical discharge machining speeds will be collectively discussed.

In both the cases of the electrode wires for the electrical discharge machining apparatus according the first and second preferred embodiments, both strength at high temperature and electrical conductivity are satisfactory, and excellent results can be confirmed.

On the other hand, in case of an electrode wire for an electrical discharge machining apparatus according an example for comparison 1, workability in drawing is defective, and it is difficult to manufacture the electrode wire for the electrical discharge machining apparatus.

In case of an electrode wire for an electrical discharge machining apparatus according to an example for comparison 2, conductivity is insufficient and the improvement of the speed of electrical discharge machining is not satisfactory.

In case of an electrode wire for an electrical discharge machining apparatus according to an example for comparison 3, strength at high temperature is insufficient, and the improvement of the electrical discharge machining speed is not satisfactory.

In case of an electrode wire for an electrical discharge machining apparatus according to an example for comparison 4, strength at high temperature is extremely low, and the breaking of a wire may occur at the time of electrical discharge machining.

In case of an electrode wire for an electrical discharge machining apparatus according to an example for comparison 5, electrical conductivity is low, and the improvement of electrical discharge machining speed is insufficient.

In case of an electrode wire for an electrical discharge machining apparatus according to an example for comparison 6 and 7, material of the core metallic wire contains Ag, and cost of material is high in general.

(The Third Preferred Embodiment)

A composite wire is formed by inserting a core metallic wire, which is formed of Cu—0.16Zr alloy and has an external diameter of 7.1 mm, into a pipe, which is formed of Cu—40 Zn alloy and has an external diameter of 10 mm and a pipe thickness of 1.2 mm.

This composite wire is formed into that with a diameter of 7.9 mm by drawing, to which heat treatment is applied at 450° C. for 1 hr. Next, the composite wire with a diameter of 7.9 mm is formed into that with a diameter of 1.2 mm by drawing, to which heat treatment is applied at 450° C. for 1 hr.

Finally, the composite wire with a diameter of 1.2 mm is formed into that with a diameter of 0.25 mm by drawing, to which heat treatment is applied. An electrode wire for an electrical discharge machining apparatus having a structure mentioned as follows can be obtained by controlling the extent of heat treatment. Concentration of Zn in the Cu—Zn alloy covering layer varies in the radial direction within a range of 35 to 45 weight percent. Concentration of Zn in a shallow layer, which is about 5 µm deep below the surface of the covering layer, is lower than that in a deep layer, and the total thickness of the Cu—Zn alloy covering layer is about 31 µm.

(The Fourth Preferred Embodiment)

The manufacturing process of the fourth preferred embodiment is the same as that of the third preferred embodiment except that a core metallic wire is formed of Cu—0.19Sn—0.2In alloy and an external diameter thereof is 7.1 mm. An electrode wire for an electrical discharge machining apparatus having a structure mentioned as follow can be obtained by controlling the extent of heat treatment. Concentration of Zn in the Cu—Zn alloy covering layer varies in the radial direction within a range of 35 to 45 weight percent. Concentration of Zn in a shallow layer, which is about 5 µm deep below the surface of the covering layer, is lower that in a deep layer, and the total thickness of the Cu—Zn alloy covering layer is about 31 µm.

Figure 2A:
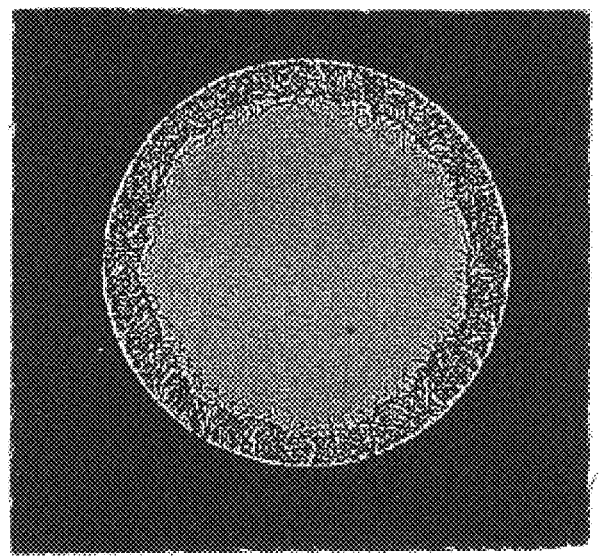
FIG. 2A is a photograph for showing a composition of a cross-section of an electrode wire for an electrical discharge machining apparatus according to the fourth preferred embodiment.
Figure 2B:
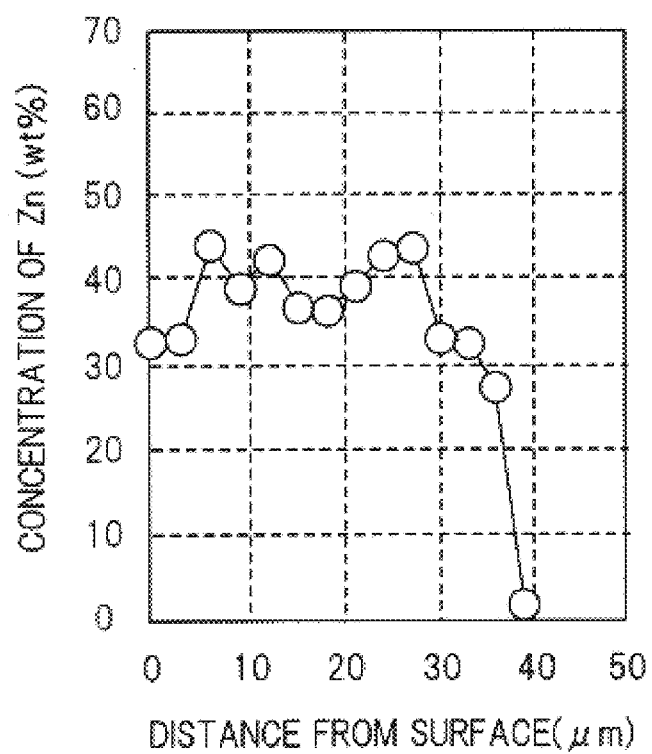
FIG. 2B shows distribution of concentration of Zn in a Cu—Zn alloy-covering layer of the fourth preferred embodiment.

As shown in FIG. 2B, in each of the electrode wires for the electrical discharge machining apparatus according to the third and fourth preferred embodiments, since concentration of Zn in a shallow layer, which is about 5 µm deep below the surface of the Cu—Zn alloy covering layer, is about 35 weight percent, workability in cold working is improved and drawing process at room temperature can be easily carried out, although there is a layer containing Zn of high concentration in an inner portion of the Zn—Cu alloy covering layer.

FIGS. 2A and 2B show the results obtained in case of the electrode wire for the electrical discharge machining apparatus according to the fourth preferred embodiment. It is a matter of course that similar results can be obtained in case of the same according to the third preferred embodiment.

As mentioned in the above, in case of the electrode wire for the electrical discharge machining apparatus according to the invention, since the Cu—Zn alloy covering layer is formed around the core metallic wire, which is formed of Cu—0.02 to 0.2 Zr alloy or Cu—0.15 to 0.25 Sn—0.15 to 0.25 In alloy, cost of production is low, satisfactory electrical conductivity and strength at high temperature can be obtained and speed and efficiency of electrical discharge machining ca be improved as compared with the conventional electrode wire for the electrical discharge machining apparatus comprising the known core metallic wire.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An electrode wire for an electrical discharge machining apparatus, comprising:

a core metallic wire formed of Cu—0.02 to 0.2 WT % Zr alloy or Cu—0.15 to 0.25 WT % Sn—0.15 to 0.25 WT % In alloy, and a Cu—Zn alloy covering layer formed of a mixing composition of α and β phases, wherein a concentration of Zn of said Cu—Zn alloy covering layer in a shallow layer below a surface of said Cu—Zn alloy covering layer is lower than the concentration of Zn in an inner portion of said Cu—Zn alloy covering layer that is further from said surface than said shallow layer.

2. An electrode wire for an electrical discharge machining apparatus according to claim 1, wherein:

said Cu—Zn alloy covering layer having a thickness of 30 to 40 µm.

* * * * *